(12) United States Patent
Foley et al.

(10) Patent No.: US 6,205,938 B1
(45) Date of Patent: Mar. 27, 2001

(54) GRAIN BOX INSERT FOR SEEDING IMPLEMENT

(75) Inventors: Daniel Michael Foley; Ralph Everette Stanfill, both of Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/401,882

(22) Filed: Sep. 23, 1999

(51) Int. Cl.[7] .................................................. B67D 5/60
(52) U.S. Cl. ........................ 111/170; 111/200; 222/462; 222/610
(58) Field of Search .................. 111/73, 75, 77, 111/170, 200, 925; 222/610, 460, 462

(56) References Cited

U.S. PATENT DOCUMENTS

Re. 31,374 * 9/1983 Dell ....................................... 210/800
4,715,515 * 12/1987 Steilen ................................ 111/77 X

OTHER PUBLICATIONS

Great Plains Advertisement, p. 14 (date unknown).

* cited by examiner

*Primary Examiner*—Christopher J. Novosad

(57) ABSTRACT

A seeding implement grain box is provided with a single piece molded plastic insert at the bottom of the box that forms an array of funnel sections having open lower ends that align with the openings in the grain box bottom wall. The funnel sections have sloping walls between each bottom wall opening to cover the flat portions of the bottom wall between the openings, thereby allowing the seed grain to completely empty from the grain box.

17 Claims, 3 Drawing Sheets

GRAIN BOX INSERT FOR SEEDING IMPLEMENT

BACKGROUND OF THE INVENTION

1. Field of the Invention

The present invention relates to a seeding implement, such as a grain drill, and in particular to an insert for the grain box that assures complete emptying of the seed from the grain box.

2. Description of the Related Art

The grain box of a grain drill typically has a flat bottom wall extending between the opposite ends of the grain box. Front and rear walls slope down to the bottom wall so that the seed will flow to the bottom wall. The bottom wall is provided with a plurality of openings spaced apart from one another between the opposite end walls of the grain box. A seed meter is associated with each one of the openings to meter seed that drops from the grain box through the openings.

A problem associated with the flat bottom wall is that seed will collect on the bottom wall between the openings, and will not fall through the openings. This results in incomplete emptying of the seed from the grain box. This requires the operator to use a hand broom to sweep the seed off the bottom wall and into the adjacent openings.

One solution to the problem of incomplete emptying the grain box is to add individual metal inserts between each of the openings. The metal inserts are inverted V-shaped and cover the bottom wall between openings. The inserts create sloping walls between each of the openings, thereby ensuring that the tank will completely empty with the seed falling through one of the openings. The metal inserts are separately attached to the grain box by a plurality of clips bolted to the grain box. While the inserts are adequate to completely empty the grain box, a significant amount of assembly labor and time is required to install the inserts in the grain box. In addition, to seal the box, a silicon bead is placed around the edges of each insert, thereby further increasing the assembly labor and material cost.

SUMMARY OF THE INVENTION

Accordingly, it is an object of the present invention to provide a simplified structure that ensures complete emptying of the grain box without excessive assembly labor and cost.

The grain box of the present invention is provided with a one or two piece molded plastic insert extending from end-to-end of the grain box. The insert forms an array of funnel sections each having open lower ends that align with the openings in the grain box bottom wall. The funnel sections have sloping walls between each bottom wall opening to cover the flat portions of the bottom wall between the openings. By molding the insert as a one or two pieces for the entire grain box, significant assembly labor savings is achieved. In addition, far less silicon is required to seal the one-piece insert to the box around the periphery of the insert.

DESCRIPTION OF THE PREFERRED EMBODIMENT

Figure 1:
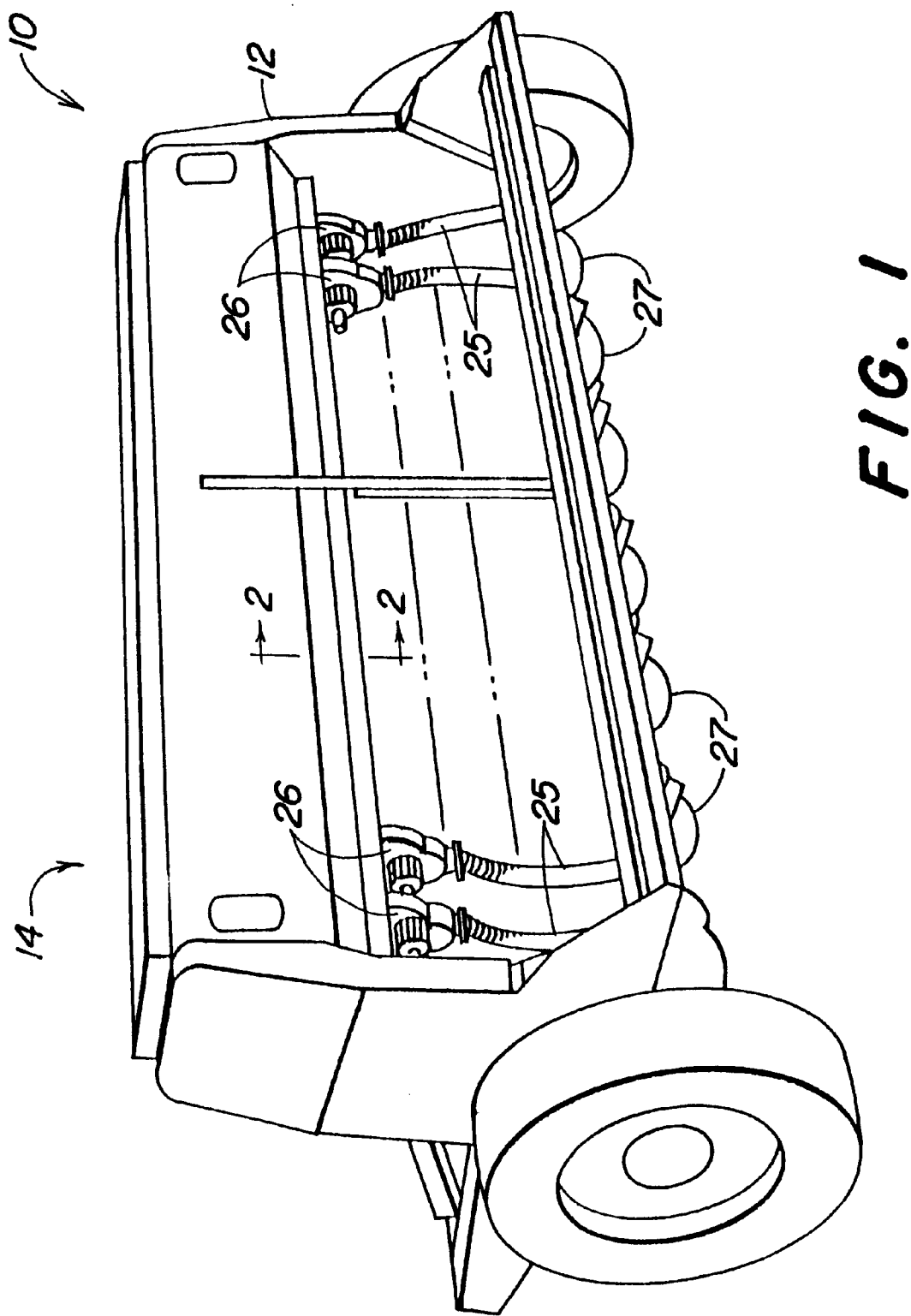
FIG. 1 is a perspective view of a grain drill having the grain box insert of the present invention.
Figure 2:
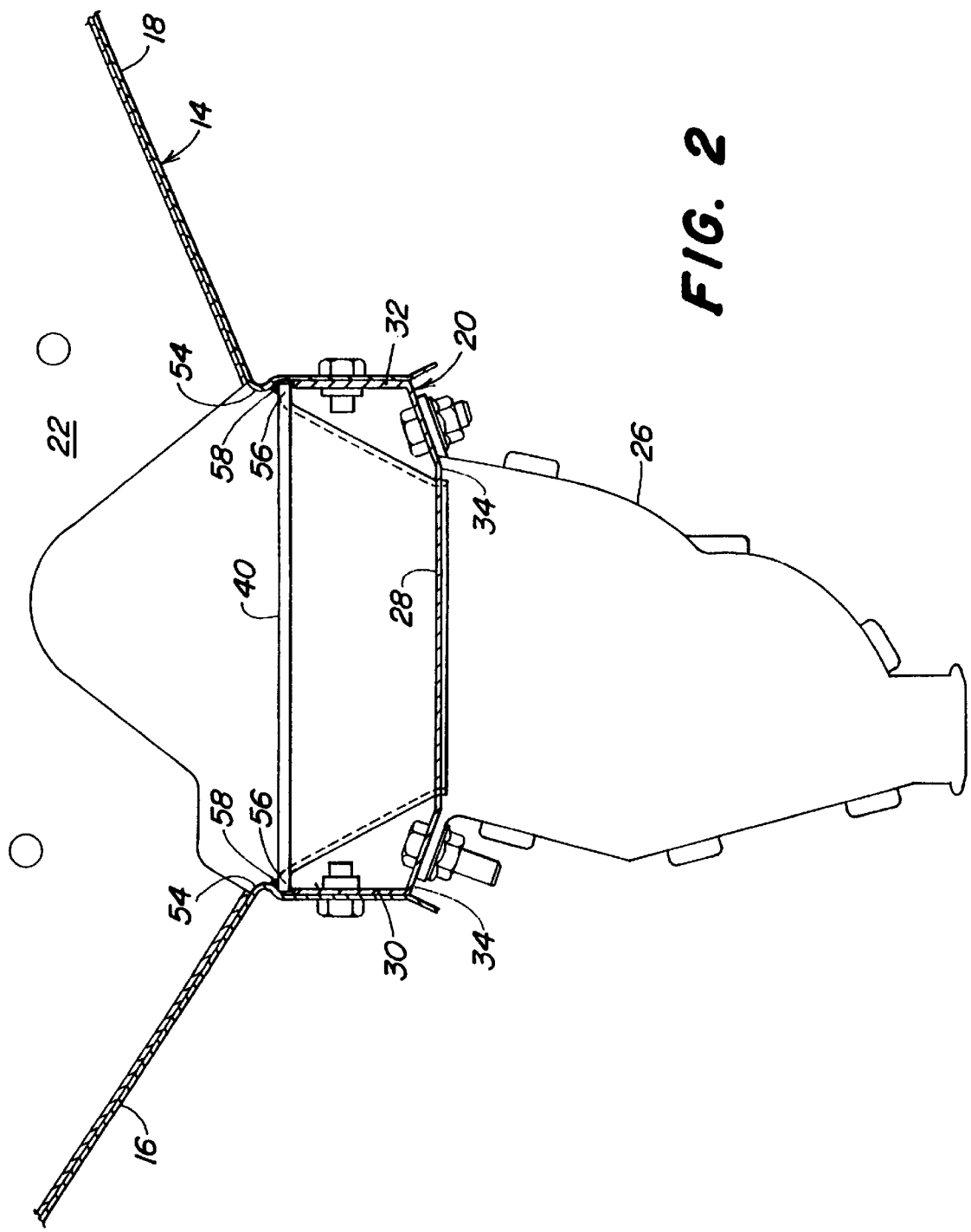
FIG. 2 is a sectional view of the lower portion of the grain box as seen from the line 2—2 in FIG. 1.

A seeding implement 10, such as a grain drill, is shown and includes a frame 12. Supported on the frame 12 is a grain box 14. The grain box 14 has a front wall 16 and a rear wall 18 that slope downward to a bottom trough 20. The grain box also has spaced end walls 22, only one of which is shown, FIG. 2. The bottom trough 20 has a plurality of spaced apart openings 24 therein. Seed from the grain box drops through the openings 24 to seed-metering devices 26 below each opening. The seed metering devices 26 meter the seed that falls through the openings 24. From the openings, the seed passes through seed tubes 25 to furrow openers 27 where the seed is deposited in a furrow in the ground.

The trough has a bottom wall 28, a front upright wall 30, a rear upright wall 32 and inclined transition portions 34 between the bottom wall 28 and the front and rear upright walls 30, 32. Between the spaced apart openings 24, the bottom wall 28 has generally flat portions 36. Seed will collect on these flat portions 36 and will not fall through an opening 24, resulting in incomplete emptying of the grain box.

The present invention provides an insert 40 that covers the bottom wall 28 to prevent accumulation of seed on the flat portions 36. The insert 40 is preferably vacuum molded of plastic as one or two pieces. Alternatively, the insert can be stamped of sheet metal. The insert 40 forms an array of funnel sections 42. The open lower end of each funnel section is aligned with an associated opening 24 in the bottom trough. The funnel sections have sloping walls leading to an open lower end 44. Sloping sidewalls 46, 48 between the open lower ends cover the flat portions 36 of the bottom trough and prevent grain from remaining thereon. In addition, the funnel sections have front and rear sloping walls 50, 52 to direct seed from the front wall 16 and the rear wall 18 of the grain box respectively. The funnel sections are rectangular in shape, each having four sloping walls. While the grain box is shown with a bottom trough, it will be appreciated that an insert according to the present invention can be used with a grain box that has a flat bottom wall extending between the lower edges of the front and rear walls 16,18.

The lower edges of the grain box front and rear walls 16,18 are formed with an overhanging lip 54, creating a shallow recess immediately therebelow. The recess receives an edge flange 56 of the insert 40 to snap fit the insert 40 in place. If desired, a small bead 58 of a silicon sealer can be placed between the lip 54 and the flange 56 to seal out dirt.

Figure 3:
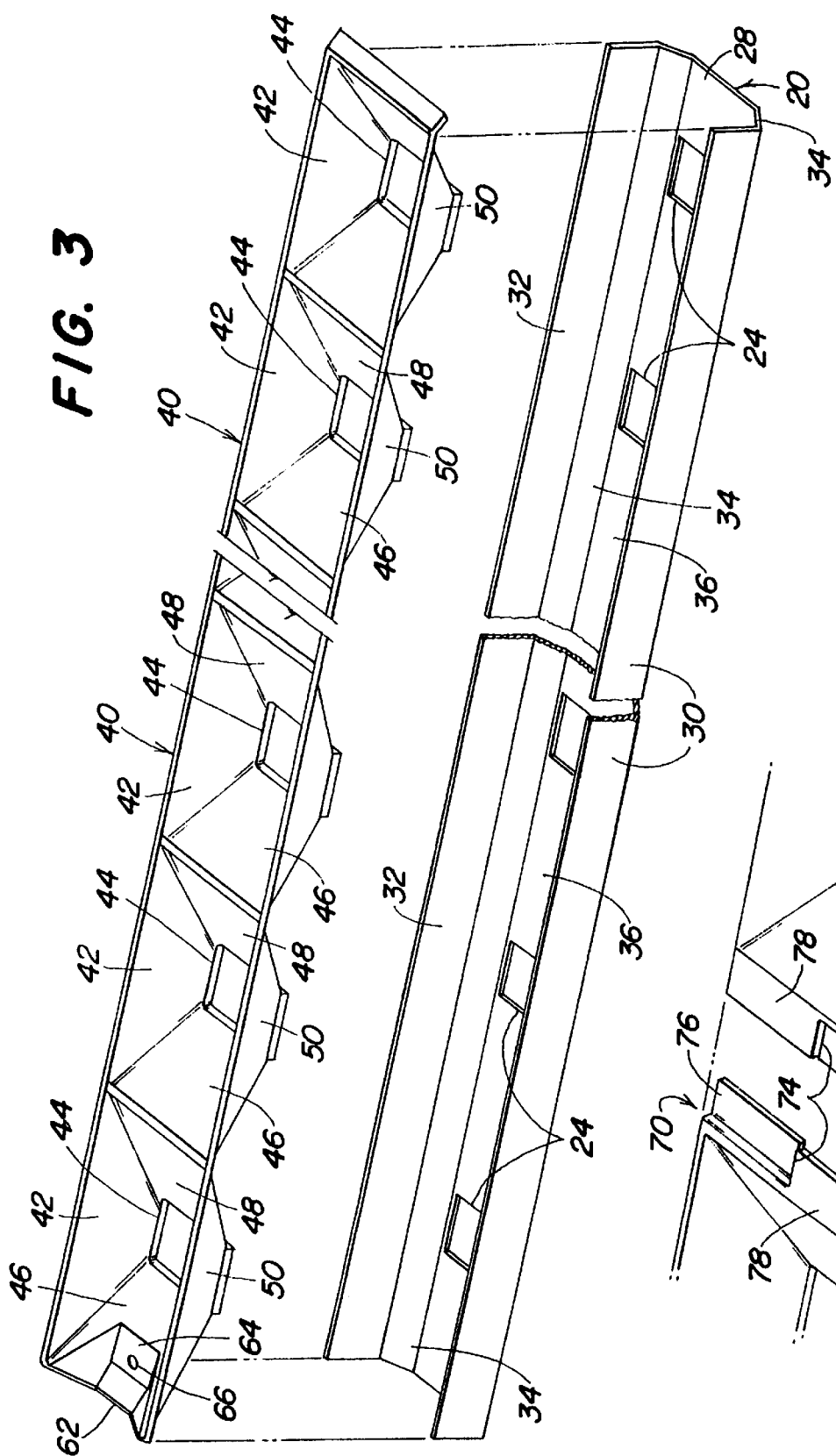
FIG. 3 is a perspective view of the insert of the present invention and the bottom wall of the grain box.

In the embodiment shown in FIG. 3, at one end 62 of the insert, the sloping sidewall 46 is interrupted with a horizontal end flange 64. An aperture 66 is formed in the end flange 64. The aperture 66 is used for a rod (not shown) to pass through the insert, connecting a float inside the grain tank to a grain level gauge visible on the outside of the grain box. In a grain drill having two separate grain boxes side-by-side, the inserts 40 are placed in each box with the ends 62 of the inserts located at the inboard ends of the grain boxes. The level gauge rods of the two grain boxes are at the inboard ends of the boxes so that the two level gauges are close to one another for convenience in viewing the two level gauges.

Figure 4:
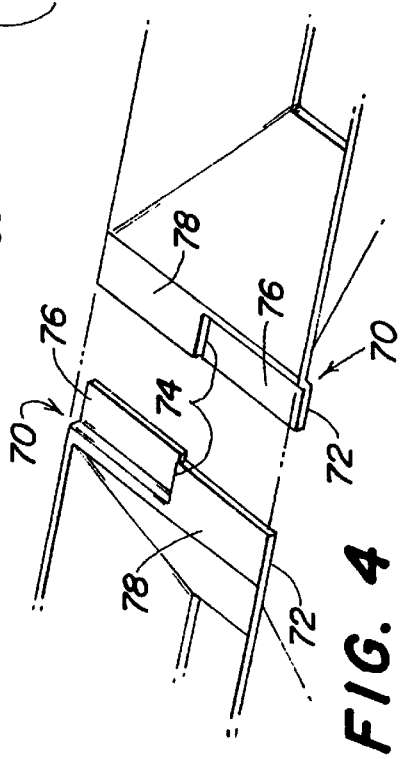
FIG. 4 is a perspective view showing the mating structure for coupling two insert pieces together.

A single insert can be made that extends between the two ends of the grain box. However, it is generally easier and less costly to have two inserts placed end-to-end in each grain box. This reduces the length of each piece and lowers the cost for the mold for the insert piece. Two identical inserts are used. The ends 62 of the two inserts having the aperture 66 for the level gauge rod are placed at the ends of the grain tank. The aperture 66 that is not used for the gauge rod is filled with a plug. The other ends 70 of the inserts are shown in FIG. 4 and provided with mating features to couple the two inserts together. The ends 70 have an end flange 72 divided by a slot 74, forming two tabs 76, 78. The tabs 76 are positioned below the plane of the tabs 78 and the two ends are mated with the tab 76 of one insert placed beneath the tab 78 of the other insert as shown in FIG. 4. While two mating inserts are shown, it will be appreciated that multiple inserts can be provided that are mated end-to-end. However, the preferred embodiment is to have only two inserts, since identical parts can be used.

The insert 40 provides a relatively simple and easily installed device that results in complete emptying of the grain box without the need for the operator to brush seeds from the flat portions 36 of the bottom wall. The flat portions 36 of the entire grain box are covered by the insert, thus reducing the assembly labor required to cover the flat portions 36. In addition, the quantity of silicon required to seal the insert 40 is significantly reduced from that used with individual inserts covering the flat portions 36 between each opening.

The invention should not be limited to the above-described embodiment, but should be limited solely by the claims that follow.

What is claimed is:

1. A seeding implement comprising:
   a frame;
   a grain box supported on the frame and having a bottom wall with a plurality of spaced apart openings therethrough for seed to drop through, the grain box further having front and rear walls and opposite end walls;
   a seed meter associated with each of the openings in the bottom wall for metering seed dropping therethrough;
   the bottom wall being generally flat with the front and rear walls being inclined downwardly toward the bottom wall; and
   an insert disposed above the bottom wall and extending between the opposite end walls, the insert forming an array of funnel sections with one funnel section for each opening in the bottom wall, each funnel section having an open lower end aligned with the associated opening in the grain box bottom wall and sloping walls between each opening whereby the portion of the bottom wall between the openings is covered by the sloping walls of the funnel sections.

2. The seeding implement as defined by claim 1 wherein the bottom wall is part of a trough comprising the bottom wall, and front and rear upright walls joined to the front and rear walls of the grain box respectively.

3. The seeding implement as defined by claim 2 wherein the insert is snap fit into a recess at the joint between the front and rear upright walls of the trough and the front and rear walls of the grain box.

4. The seeding implement as defined by claim 1 further comprising a sealer between the insert and the grain box.

5. The seeding implement as defined by claim 1 wherein the funnel sections have a rectangular shape.

6. The seeding implement as defined by claim 1 further comprising a vertical aperture at one end of the insert.

7. The seeding implement as defined by claim 1 further comprising a pair of grain boxes arranged side-by-side having inner ends adjacent one another and spaced apart outer ends, each grain box having an insert therein wherein the inserts are identical to one another with the insert of one grain box rotated end-to-end relative to the insert of the other grain box.

8. The seeding implement as defined by claim 7 wherein inner ends of the two inserts have an aperture therethrough.

9. The seeding implement as defined by claim 1 wherein the insert is a single piece of molded plastic.

10. A seeding implement comprising:
    a frame;
    a grain box supported on the frame and having a bottom wall with a plurality of spaced apart openings therethrough for seed to drop through, the grain box further having front and rear walls and opposite end walls;
    a seed meter associated with each of the openings in the bottom wall for metering seed dropping therethrough;
    the bottom wall being generally flat with the front and rear walls being inclined downwardly toward the bottom wall; and
    two insert pieces arranged end-to-end and disposed above the bottom wall, each insert forming an array of multiple funnel sections sized to fit above the bottom wall with each funnel section having an open lower end aligned with the associated opening in the grain box bottom wall and sloping walls between each opening whereby the portion of the bottom wall between the openings is covered by the sloping walls of the funnel sections.

11. The seeding implement as defined by claim 10 wherein the two insert pieces are identical to one another.

12. The seeding implement as defined by claim 11 wherein the insert pieces have mating structures at adjacent ends to join the two insert pieces to one another.

13. The seeding implement as defined by claim 12 wherein the two insert pieces have two end tabs separated by a slot with one tab below the plane of the other tab whereby the two ends are mated by placing the lower tab of one insert piece beneath the upper tab of the other insert piece.

14. An insert for a grain box of a seeding implement, the grain box having a bottom wall with a plurality of spaced apart openings therethrough for seed to drop through, the grain box further having front and rear walls and opposite end walls, the bottom wall being generally flat and the front and rear walls of the grain box being inclined downwardly toward the bottom wall, the insert comprising:
    a single piece forming an array of multiple funnel sections sized to fit over the bottom wall, each funnel section having an open lower end aligned with the associated opening in the grain box bottom wall and sloping walls between each opening whereby the bottom wall between the openings is covered by the sloping walls of the funnel sections.

15. The insert as defined by claim 14 wherein the insert is a single piece of molded plastic.

16. The insert as defined by claim 14 wherein the funnel sections have a rectangular shape.

17. The insert as defined by claim 14 further comprising an aperture at one end of the insert.

* * * * *